No. 865,591. PATENTED SEPT. 10, 1907.
G. C. HORST.
CONVEYER.
APPLICATION FILED JAN. 8, 1906.

2 SHEETS—SHEET 1.

WITNESSES:
Paul J. Gathmann
N. Curtis Lammorts

George C. Horst
INVENTOR;
BY HIS ATTORNEY
H. W. Bliss.

THE NORRIS PETERS CO., WASHINGTON, D. C.

No. 865,591. PATENTED SEPT. 10, 1907.
G. C. HORST.
CONVEYER.
APPLICATION FILED JAN. 8, 1906.

2 SHEETS—SHEET 2.

WITNESSES
Paul J. Gathmann
N. Curtis Lammond

George C. Horst,
INVENTOR,
BY HIS ATTORNEY
H. A. Bliss.

UNITED STATES PATENT OFFICE.

GEORGE C. HORST, OF COLUMBUS, OHIO, ASSIGNOR TO JOSEPH A. JEFFREY, OF COLUMBUS, OHIO.

CONVEYER.

No. 865,591.   Specification of Letters Patent.   Patented Sept. 10, 1907.

Application filed January 8, 1906. Serial No. 295,144.

*To all whom it may concern:*

Be it known that I, GEORGE C. HORST, a citizen of the United States, residing at Columbus, in the county of Franklin and State of Ohio, have invented certain new and useful Improvements in Conveyers, of which the following is a specification, reference being had therein to the accompanying drawing.

My invention relates to an endless chain conveyer that is principally designed for the elevating or conveying of rough material such as broken stone or coal by means of buckets attached to the links of the chain; and it has for its object to produce a chain of great power and so constructed as to long withstand the wear that is incident to conveyers used for the purposes referred to.

Figure 1:
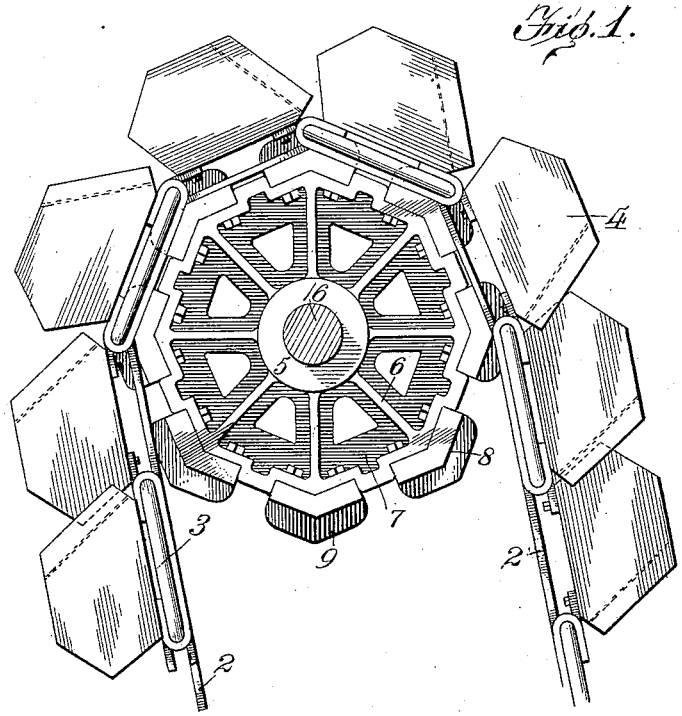
Figure 2:
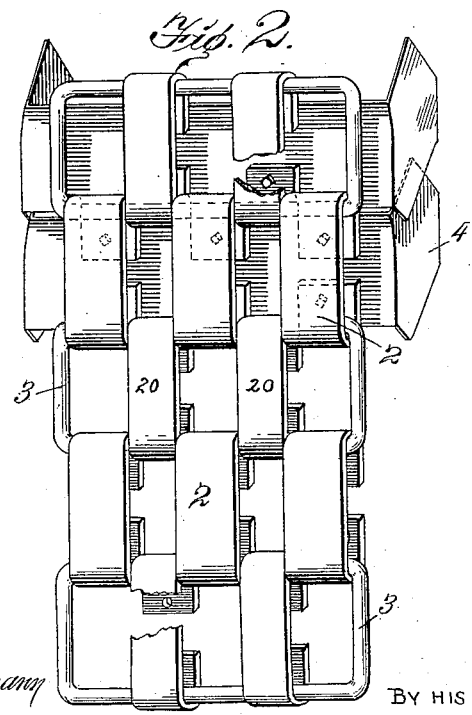
Figure 3:
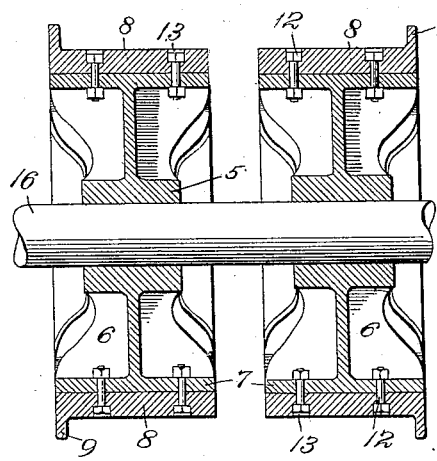
Figure 4:
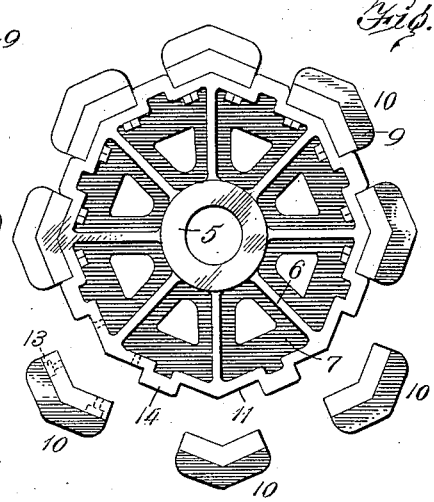
Figure 5:
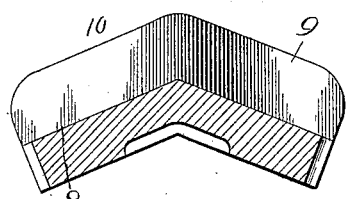
Figure 6:
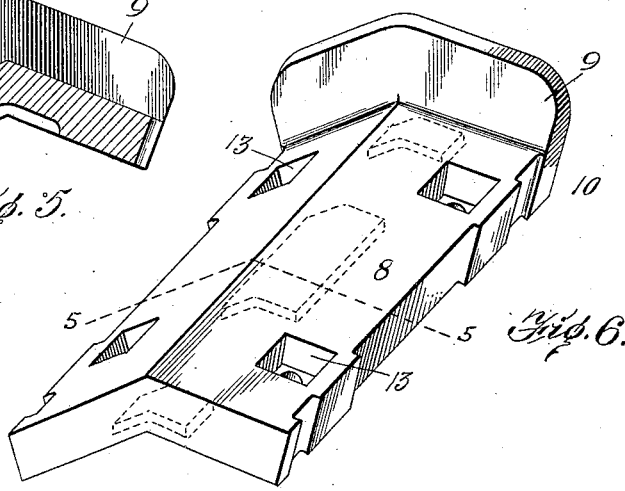

Figure 1 is a side elevation of a portion of a conveyer embodying my improvements. Fig. 2 is a perspective view of a short section of the endless conveyer, as seen from the rear. Fig. 3 is a cross sectional view taken through one of the chain wheels. Fig. 4 is an elevation illustrating the construction of the chain wheel and the manner of attaching thereto the wearing pieces. Fig. 5 is a sectional view, taken on the line 5—5 of Fig. 6. Fig. 6 is a perspective view of one of the detachable wearing pieces of the wheel removed.

The chain that is used in this conveyer is formed of a series of alternate strap links 2 and closed round bar links 3. These links are coupled together flatwise and are relatively broad so as to present large bearing surfaces to the wheels and also present broad faces for the attachment of the buckets 4. I prefer that the links 3 should be quite broad, and intermediately braced, as by the connecting pieces 20 arranged to unite the opposite end bars of such links, and that between each adjacent pair of links 3, and uniting them, there should be two or more of the strap links 2, so that there is formed a relatively wide web-like chain belt as represented in Fig. 2.

The wheel consists of a central body portion comprising the hub 5, a series of radiating spokes 6 and a rim 7, these parts being preferably cast integral. The wheel, unlike most wheels used with chain conveyers, is not provided with sprocket or chain-engaging teeth, but instead has a series of peripheral bearing surfaces upon which the flat faces of the links are adapted to rest. It has been demonstrated that with a chain having relatively broad links, such as shown, the engagement thereof with the flat angularly arranged faces of a wheel will be sufficient for all purposes.

8 indicates the bearing faces of the chain. The number of such faces will of course be varied to suit the size of the wheel. I prefer that the wheel should be provided with the flanges 9 between which the chain rests and by which it is held upon the wheel. As the conveyer used for carrying stone and other gritty material is subject to rapid wear I prefer that the wearing faces of the wheel should be made removable and renewable, in order that the chain-engaging parts may be replaced as they become worn, and also to enable the use of metal of a greater hardness, for such chain-engaging parts, than it would be practical to use for the entire wheel. I prefer to construct the body part of the wheel so as to receive a series of detachable wearing plates, and I form these of metal having a hard chilled chain-engaging surface.

10 indicates, as a whole, one of the removable plates constituting part of the wearing surface and chain-engaging part of the wheel. It is preferably angularly shaped longitudinally and is adapted to be seated upon the peripheral portion of the wheel body at the angle where two of the peripheral faces of the wheel meet. Each wearing plate is therefore adapted to form part of two adjacent chain-engaging faces. The face or rim portion of the wheel 7 is formed with a series of recesses 11 in which the plates 10 are seated. The latter are secured to the wheel rim by nuts and bolts 12, the heads of the bolts being seated in recesses 13 formed therefor in the faces of the wearing plates. I prefer to form the wheel rim with a series of outward extending projections 14 arranged to separate the spaces 11 for the bearing plates and to constitute end abutments for the latter, thereby assisting in holding them in place. The outer peripheral faces of the projections 14 are a little inside of or below the bearing faces of the wearing plates 10 so that they receive but little if any wear from the chain. The side flanges or rims 9 of the wheel are preferably carried by the removable wearing plates 10.

When a wide web-like chain belt such as shown in the drawings is employed, formed of a plurality of parts arranged side by side, each wheel with which the chain belt engages may be formed of two separate and independent body or supporting parts mounted upon a shaft 16 and each having a set of wearing surfaces for one line of chain parts. I prefer to thus form the parts of the wheel that engage with the separate links 2 separate from each other, as they can then be easily spaced apart upon the shaft to suit the transverse distance between the sets of links 2.

Where the conveyer is provided with a chain belt such as shown it is only necessary to provide peripheral flanges 9 for engagement with the outer edges of the conveyer belt, and therefore each wearing plate 10 need carry but one flange, as represented in Fig. 3.

A conveyer of the character described is especially adapted for rough work, as it possesses great strength, is of very simple construction and is well adapted to resist wear.

As the parts of the chain or belt of the conveyer become worn the pitch thereof is increased and to correspondingly increase the pitch of the wheels with which the chain or belt engages the bolts 12 may be loosened and liners or shims may be inserted under the bearing plates 10 in order to set out the working faces of the wheel.

It will be observed that the bearing faces with which the chain or belt engages are plane, that is they are unobstructed by projections such as sprocket teeth; and also that the bearing portions of the chain or belt are likewise plane and adapted to rest upon the flat or plane surfaces of the wheel.

What I claim is:

1. In a conveyer, the herein described chain wheel, comprising a polygonal central body portion and a series of angular bearing pieces fitted to the rim of the wheel body at the angles thereof, each bearing piece being provided with a side flange or rim, substantially as set forth.

2. In a conveyer, the combination of a web chain, comprising a plurality of broad, flat-surfaced links, and a wheel with which the chain engages, comprising a central body portion of polygonal shape, and a series of bearing pieces fitted in recesses in the rim of the wheel and formed with flat, unobstructed surfaces with which the said flat links of the chain engage, the said bearing pieces being provided with edge flanges, substantially as set forth.

3. In a conveyer, the combination of a web chain, comprising a plurality of flat links arranged side by side and a wheel with which the chain engages formed of two independent parts mounted upon a supporting shaft, each part comprising a central body and a series of bearing plates secured to the periphery thereof, each bearing plate being provided along its outer edge with a flange 9, substantially as set forth.

In testimony whereof I affix my signature, in presence of two witnesses.

GEORGE C. HORST.

Witnesses:
J. W. ROCKFIELD,
M. W. SHERWOOD.